United States Patent
Schroff et al.

(10) Patent No.: US 10,452,954 B2
(45) Date of Patent: Oct. 22, 2019

(54) OBJECT DETECTION AND REPRESENTATION IN IMAGES

(71) Applicant: Google LLC, Mountain View, CA (US)

(72) Inventors: Gerhard Florian Schroff, Santa Monica, CA (US); Wenze Hu, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 29 days.

(21) Appl. No.: 15/704,746

(22) Filed: Sep. 14, 2017

(65) Prior Publication Data

US 2019/0080204 A1 Mar. 14, 2019

(51) Int. Cl.
*G06K 9/62* (2006.01)
*G06K 9/00* (2006.01)
*G06F 16/583* (2019.01)

(52) U.S. Cl.
CPC ....... *G06K 9/6248* (2013.01); *G06F 16/5854* (2019.01); *G06K 9/00369* (2013.01); *G06K 9/00677* (2013.01); *G06K 9/6215* (2013.01); *G06K 9/6218* (2013.01); *G06K 9/6245* (2013.01); *G06K 9/6256* (2013.01); *G06K 9/6265* (2013.01)

(58) Field of Classification Search
CPC ............ G06T 2207/20081; G06K 9/66; G06K 9/6248; G06K 9/00677
See application file for complete search history.

(56) References Cited

U.S. PATENT DOCUMENTS

| 8,582,807 | B2* | 11/2013 | Yang | G06K 9/00248 382/103 |
| 9,836,641 | B2* | 12/2017 | Philbin | G06K 9/00288 |
| 2015/0065803 | A1* | 3/2015 | Douglas | A61B 1/00009 600/200 |
| 2015/0261787 | A1* | 9/2015 | Hu | G06K 9/00288 382/118 |
| 2017/0083792 | A1* | 3/2017 | Rodriguez-Serrano | G06F 16/54 |

(Continued)

OTHER PUBLICATIONS

X. Wang and A. Gupta, "Unsupervised Learning of Visual Representations Using Videos," 2015 IEEE International Conference on Computer Vision (ICCV), Santiago, 2015, pp. 2794-2802.*

(Continued)

*Primary Examiner* — Chan S Park
*Assistant Examiner* — Mai H Tran
(74) *Attorney, Agent, or Firm* — Fish & Richardson P.C.

(57) ABSTRACT

Methods, systems, and apparatus, including computer programs encoded on a computer storage medium, for object detection and representation in images. In one aspect, a method includes detecting occurrences of objects of a particular type in images captured within a first duration of time, and iteratively training an image embedding function to produce as output representations of features of the input images depicting occurrences of objects of the particular type, where similar representations of features are generated for images that depict the same instance of an object of a particular type captured within a specified duration of time, and dissimilar representations of features are generated for images that depict different instances of objects of the particular type.

18 Claims, 6 Drawing Sheets

(56) References Cited

U.S. PATENT DOCUMENTS

| | | | |
|---|---|---|---|
| 2017/0154212 A1* | 6/2017 | Feris | G06K 9/00369 |
| 2017/0243082 A1* | 8/2017 | Song | G06K 9/6212 |
| 2017/0255832 A1* | 9/2017 | Jones | G06K 9/00718 |
| 2017/0278289 A1* | 9/2017 | Marino | G06T 7/44 |
| 2017/0343481 A1* | 11/2017 | Jahanshahi | G06N 3/0454 |
| 2017/0357896 A1* | 12/2017 | Tsatsin | G06N 3/084 |

OTHER PUBLICATIONS

PCT International Search Report and Written Opinion in International Application No. PCT/US2018/036928, dated Sep. 5, 2018, 14 pages.

Son et al. "Multi-object Tracking with Quadruplet Convolutional Neural Networks", 2017 IEEE Conference on Computer Vision and Pattern Recognition, dated Jul. 21, 2017, 10 pages.

Sermanet et al. "Time-Contrastive Networks: Self-Supervised Learning from Multi-View Observation", arxiv.org, Cornell University Library, dated Apr. 23, 2017, 14 pages.

Schroff et al. "FaceNet: A Unified Embedding for Face Recognition and Clustering", 2015 IEEE Conference on Computer Vision and Pattern Recognition (CVPR), dated Jun. 7, 2015, 9 pages.

Sankaranarayanan et al. "Triplet probabilistic embedding for face verification and clustering", 2016 IEEE $8^{th}$ International Conference on Biometrics Theory, Applications and Systems (BTAS), dated Sep. 6, 2016, 8 pages.

Liu et al. "Learning Deep Features via Congenerous Cosine Loss for Person Recognition," arXiv1702.06890v2 Mar. 31, 2017, 7 pages.

Papandreou et al. "Towards Accurate Multi-person Pose Estimation in the Wild," arXiv 1701.01779v1, Jan. 6, 2017, 10 pages.

Zhang et al. "Beyond Frontal Faces: Improving Person Recognition Using Multiple Cues," arXiv 1501.05703v2, Jan. 30, 2015, 10 pages.

* cited by examiner

OBJECT DETECTION AND REPRESENTATION IN IMAGES

BACKGROUND

This specification relates to image processing.

Manual organization and retrieval of stored images may be difficult. For example, manually viewing and grouping images may be time-consuming due to the volume and complexity of stored images.

Automated methods for image organization may group images based on similarities identified between images. Some of these methods optimize a model function to use in identifying similarities between images. A variety of model functions and training methodologies can be used. For example, a facial recognition process may be used to retrieve photos in which the detected "objects" are faces. This provides a person search feature that groups personal photos based on the similarities of detected faces. However this approach does not work for person images where the face is not recognizable, such as face too small, occluded by other objects, or at an angle that cannot be overcome by the facial recognition process.

SUMMARY

This specification describes technologies relating to image processing, and in particular training an image embedding function that generates similar representations of features for images that depict the same instance of an object of a particular type captured within a specified duration of time, and dissimilar representations of features for images that depict different instances of objects of the particular type.

In general, one innovative aspect of the subject matter described in this specification can be embodied in a method for training an image embedding function. The method includes: detecting occurrences of objects of a particular type in each image in a training set of images, where the images in the training set of images are images that have been captured within a first duration of time; extracting sub-images from the images in the training set of images, where each sub-image depicts one occurrence of a detected object; iteratively training an image embedding function, where the image embedding function comprises a set of parameter weights that operate on an input image to produce as output a representation of features of the input image, each iteration of the training including: selecting image pairs of a first type and image pairs of a second type from the extracted sub-images, each image pair being a combination of a first sub-image and a second sub-image, where: an image pair of the first type includes a first sub-image and a second sub-image that depict a same instance of an object of the particular type; an image pair of the second type includes a first sub-image and a second sub-image that depict different instances of objects of the particular type; and for an image pair of the first type, at least the first sub-image and the second sub-image of the image pair were extracted from images captured within a second duration of time, where the second duration of time is shorter than the first duration of time; providing each selected image pair as input to the image embedding function and generating corresponding outputs; determining a performance measure of the image embedding function; adjusting the parameter weights of the image embedding function based on the performance measure; and performing another iteration of the training until a cessation event occurs.

In some implementations, selecting image pairs of the first type and of the second type includes selecting image triplets, each image triplet being a combination of a first sub-image, a second sub-image, and a third sub-image, where: the image pair comprising the first sub-image and second sub-image is an image pair of the first type; and the image pair comprising the first sub-image and the third sub-image is an image pair of the second type.

In some implementations, providing an image triplet as input to the image embedding function and generating corresponding outputs includes generating, by the image embedding function, a first representation of the features of the first image in the image triplet, a second representation of the features of the second image in the image triplet, and a third representation of the features of the third image in the image triplet.

In some implementations, determining the performance measure of the image embedding includes, for each selected image triplet: determining, based on the first representation of features and the second representation of features, a first similarity measure that measures a similarity of the first representation of features to the second representation of features; and determining, based on the first representation of features and the third representation of features, a second similarity measure that measures a similarity of the first representation of features to the third representation of features.

In some implementations, the image embedding function generates mappings of input images in Euclidean space as output feature representations; and for each selected image triplet: determining the first similarity measure comprises determining a first Euclidean distance between the first representation of the features and the second representation of features; and determining the second similarity measure comprises determining a second Euclidean distance between the first representation of the features and the third representation of features.

In some implementations, determining a performance measure of the image embedding function is based on the first Euclidean distance and the second Euclidean distance for each selected image triplet.

In some implementations, determining the performance measure based on the first Euclidean distance and the second Euclidean distance for each selected image triplet comprises determining a hinge loss based on a difference of the first Euclidean distance and the second Euclidean distance for each selected image triplet.

In some implementations, determining the performance measure includes summing the hinge losses for the selected image triplets.

In some implementations, the image embedding function includes a convolutional neural network.

In some implementations, the objects are full human bodies.

In some implementations, the feature representations generated by the trained neural network are assigned to groups using a clustering algorithm.

In some implementations, each extracted sub-image is annotated with key points; the output of the image embedding function includes the feature representation of the input image and predicted key point annotations of the input image; and determining the performance measure of the image embedding function includes determining a similarity between the predicted key point annotations and the key point annotations.

In some implementations, extracting sub-images from the images in the training set of images further includes: annotating each sub-image with key points; selecting a particular sub-image as a reference image; and transforming each sub-image to align its key points with the key points of the reference sub-image.

In some implementations, each extracted sub-image is annotated with key points; the input of the image embedding function comprises an input image and annotated key points of the input image; and providing each selected image pair as input to the image embedding function further includes providing the annotated key points of each sub-image in each selected image pair as inputs to the image embedding function.

In some implementations, for an image pair of the first type, the first sub-image and the second sub-image are selected based on the images from which they are extracted being captured during a particular event.

In some implementations, for an image pair of the first type, the first sub-image and the second sub-image are selected based on the images from which they are extracted being captured within the second duration of time.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The systems and methods described below train an image embedding function that generates similar representations of features for images that depict the same instance of an object of a particular type captured within a specified duration of time, and dissimilar representations of features for images that depict different instances of objects of the particular type. By requiring the image embedding function to generate similar representations of features for images that depict the same instance of an object of a particular type captured only within a specified duration of time, the image embedding function may be applied in the context of person recognition without facial recognition processing. This is because, in part, the appearance of a person during the specified duration likely does not change, e.g., the person is wearing the same clothes, same jewelry, etc. This is especially advantageous for processing images in faces may be partially or entirely obscured, and thus is an improvement in the technological field of image recognition processing.

Additionally, the image embedding function can be implemented by a simplified model, and the process of training the image embedding function may be less time-consuming and less computationally intensive than if the image embedding function were required to generate similar representations of features for images that depict the same instance of an object of a particular type, regardless of the duration of time between when the images were captured. These advantages are also improvements in the technological field of image processing.

The image embedding function can be trained to predict the location of key points in the input image in addition to generating a feature representation of the input image. This endows the image embedding function with that increases the quality of the feature representations generated by the image embedding function over embedding functions that do not use key points.

A transformation may be applied to align the key points of a given image with the key points of a reference image prior to providing the given image as input to the image embedding function during training. Such a transformation allows the image embedding function to be implemented by a simplified model, and causes the process of training the image embedding function to be less time-consuming and less computationally intensive than if the model were trained without such transformations of key points.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

To train the image embedding function, a system detects occurrences of objects of a particular type in each image in a training set of images. The images in the training set of images are images that have been captured within a first duration of time, and each image may depict one or more objects of the particular type. There are many object types, and each object type may be considered a category of objects that have similar visual characteristics. For example, object types may be persons, or landmarks, or cars, as each have respectively similar visual characteristics.

Once the objects are detected, the system extracts sub-images from the images in the training set of images. Each sub-image depicts one occurrence of a detected object. For example for an image that depicts two occurrence of a "person" object type, two sub-images, each depicted the detected person object, are extracted from the image.

The system then iteratively trains an image embedding function on image triplets, which will be described in more detail below. The image embedding function includes a set of parameter weights that operate on an input image to produce as output a representation of features of the input image. Each iteration of the training comprising selecting the image triplets, and providing each selected image triplet as input to the image embedding function and generating corresponding outputs. A performance measure of the image embedding function is determined, and the parameter weights of the image embedding function are adjusted based on the performance measure. Thereafter, another iteration is performed until a cessation event occurs.

To select the image triplets from the extracted sub-images, the system selects a combination of a first sub-image extracted from a first image, a second sub-image extracted from a second image, and a third sub-image extracted from a third image. The first and second sub-images depict a same instance of an object of the particular type. For example, the first and second sub-images may be depictions of a particular person at two different times from images taken within a second duration of time that is less than the first duration of time. The third sub-image depicts an instance of an object of the particular type that is different from the same instance of the object depicted in the first and second sub-images. For example, the third sub-image may be a different person than depicted in the first and second sub-images. The third sub-image may be from an image taken at any time during the first duration.

These features and additional features are described in more detail below.

Figure 1A:
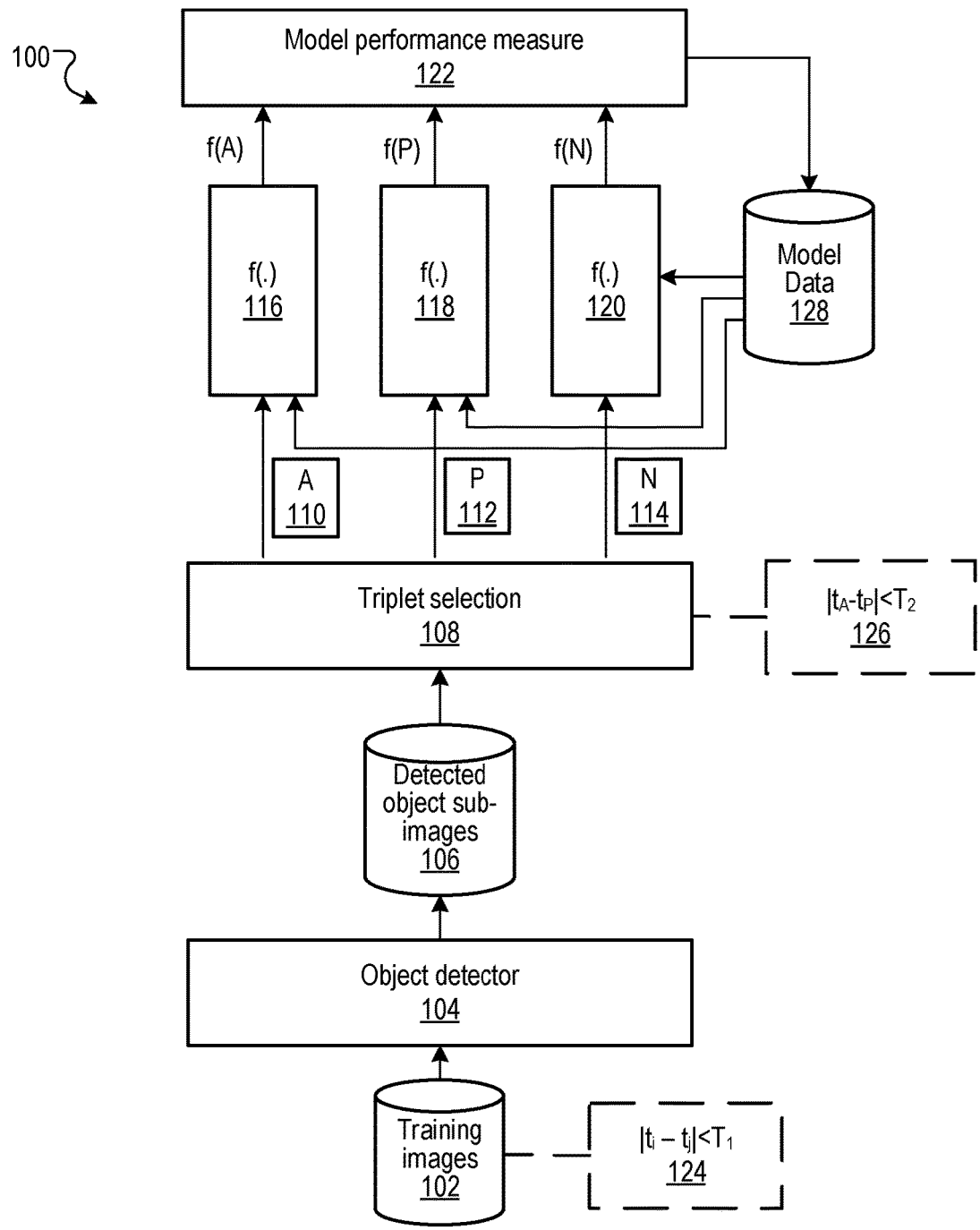
FIG. 1A is a block diagram of a network architecture for learning an image embedding function based on image triplet training data.

FIG. 1A is a block diagram of a system 100 for learning an image embedding function $f(.)$ based on image triplet training data. The system 100 can be implemented in a data processing apparatus system of one or more networked computers.

The system 100 iteratively trains the image embedding function on image triplets of three images 110, 112, 114. The image 110, 112 and 114 depict occurrences of objects of a particular type 106 that are detected by an object detector 104 from training images 102 that have been captured during a first time duration $T_1$ 124. The image embedding function is based on a set of parameter weights W that operate on an input image to produce as output a representation of features of the image. Data defining the image embedding function is stored in model data 128.

Each image triplet is a combination of a first image 110, a second image 112 and a third image 114. While the triplets are typically sub-images extracted from other images, they may also be entire images, depending on how the object is depicted in the image. However, for the remainder of this description, the triplets will be referred to as "sub-images," as they are most often extracted from a larger image.

The first sub-image 110 may be considered an "anchor" image A, the second sub-image 112 may be considered a "positive" image P, while the third sub-image 114 may be considered a "negative" image N. Triplets are selected such that the first and second sub-images are identified as depictions of a same instance of an object of the particular type, and the third sub-image is identified as depicting a different object of the particular type that is different from the same instance of the object depicted in the first and second images. Moreover, the sub-images from which the first and second detected objects were respectively detected were captured within a second time duration $T_2$ that is a proper subset of the first time duration $T_1$ 126. For example, if the first time duration is a 30 day duration, the second time duration may be a six hour duration.

As will be described below, the system 100 uses the triplets to train an image embedding function that can, once trained, generate similar representations of features of the same instance of an object of a particular type captured within a specified time duration ($T_2$), and dissimilar representations of features of different instances of objects of the particular type. As used in this description, a representation of features may be, for example, one or more sets of feature weights output by the image embedding function.

Figure 1B:
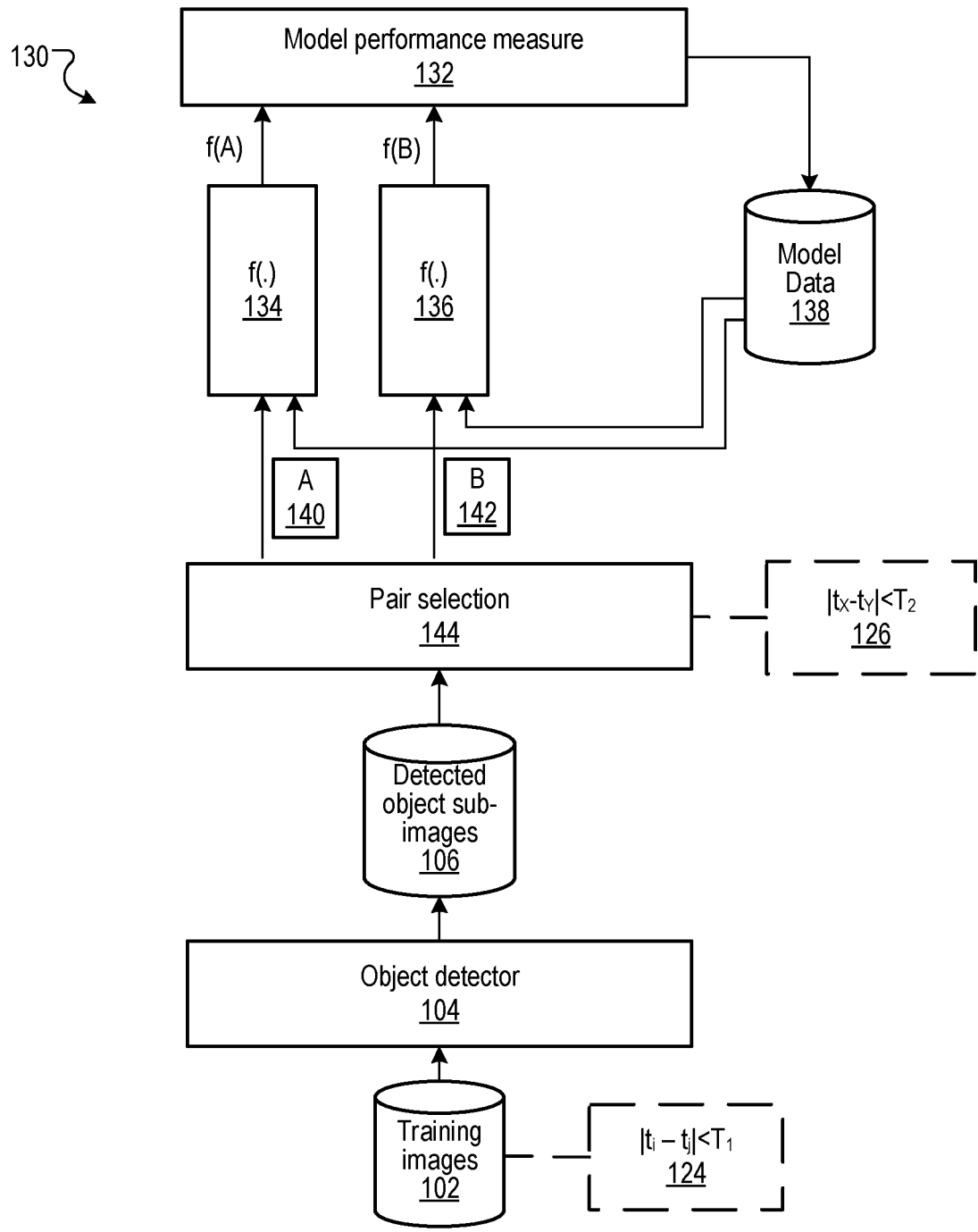
FIG. 1B is a block diagram of a network architecture for learning an image embedding function based on image pair training data.

In some implementations, instead of a selection of triplets, image pairs can be selected. FIG. 1B is a block diagram of a system 130 for learning an image embedding function $f(.)$ based on image pair training data. The system 130 can be implemented in a data processing apparatus system of one or more networked computers.

The system 130 learns an image embedding function $f(.)$ based on image pair training data, and its components are defined analogously to the system 100. The system 130 iteratively trains the image embedding function on image pairs of two sub-images 140 and 142. An image pair may be of a first type, where the two sub-images depict a same instance of an object of the particular type and were extracted from images captured within the second time duration $T_2$, or the image pair may be of the second type, where the two sub-images depict different instances of objects of the particular type.

As will be described below, and analogously to the system 100, the system 130 uses the image pairs to train an image embedding function that can, once trained, generate similar representations of features of the same instance of an object of a particular type captured within a specified time duration ($T_2$), and dissimilar representations of features of different instances of objects of the particular type.

Figure 2A:
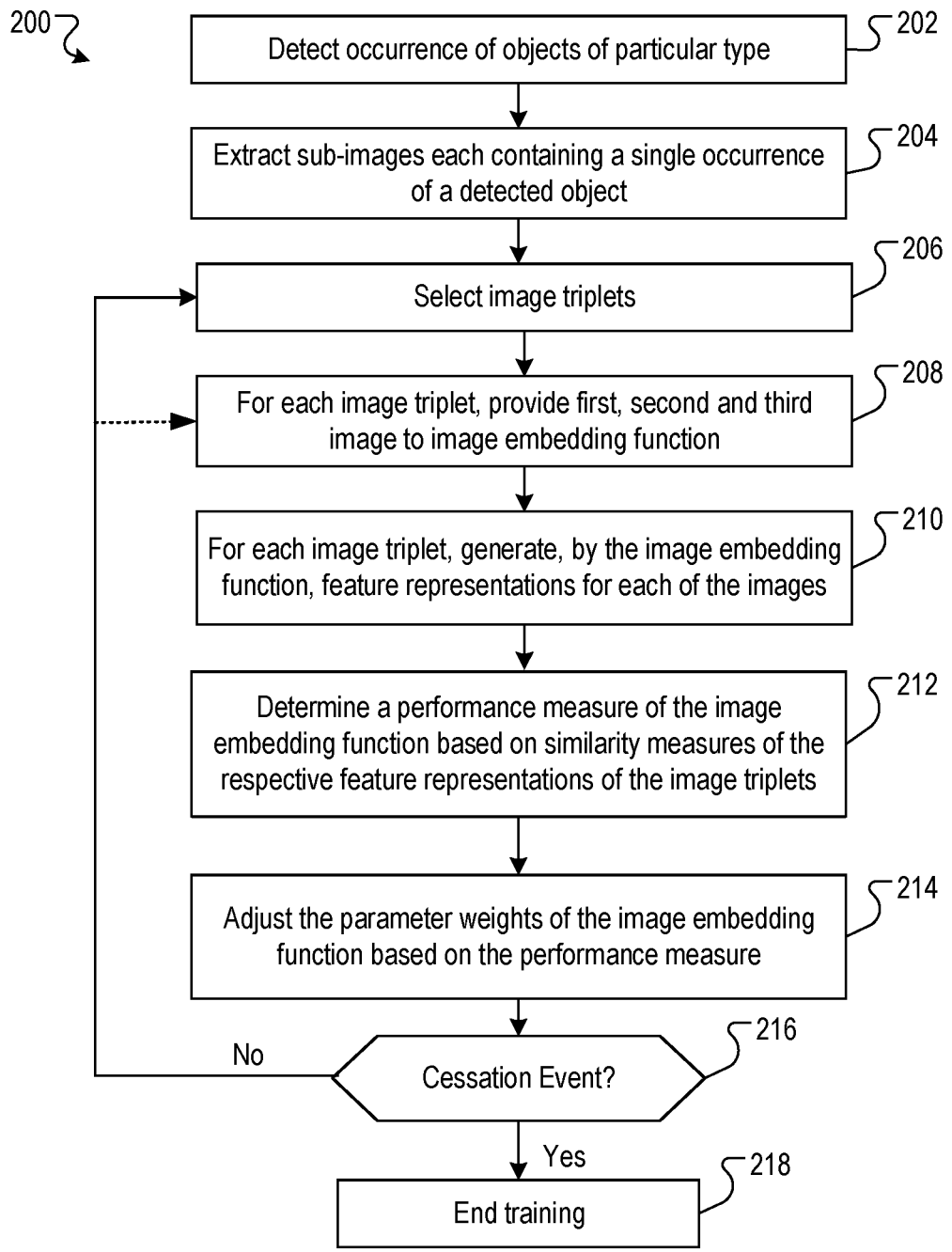
FIG. 2A is a flow diagram of an example process for learning the image embedding function based on image triplet training data.

Operation of the system 100 is described with reference to FIG. 2A, which is a flow diagram of an example process 200 for learning the image embedding function based on image triplet training data. The process 200 can be implemented in a data processing apparatus system of one or more networked computers, and the data processing apparatus performs the steps described below unless other stated.

The process 200 is described in the context of a particular image embedding function that generates representations whose similarity can be determined based on a distance metric. Furthermore, one example implementation of the image embedding function $f(.)$ maps an image into a point in Euclidean space. However, other image embedding functions that generate other representations of images can also be used. Accordingly, any appropriate tunable function that can be iteratively trained by the process 200 can be used, and thus the image embedding function need not be the particular example function described below.

The process 200 detects occurrences of objects of a particular type (202). For example, occurrences of objects of a particular type are detected in images in the training set of images 102. The images in the training set of images are images that have been captured during a first duration of time $T_1$ 124. Detecting occurrences of objects of a particular type can be performed by an automated method. Some images in the training set of images may contain no occurrences of objects of the particular type.

The process 200 extracts sub-images, where each sub-images contains a single occurrence of a detected object (204). For example, sub-images are extracted from images in the training set of images, where each sub-image is a contiguous region in the interior of an image from the training set of images. Each sub-image depicts one occurrence of a detected object.

Multiple sub-images may be extracted from one image in the training set of images. The sub-images may overlap, and in particular, a same occurrence of an object may be depicted by multiple sub-images extracted from a same image in the training set of images. A sub-image may be defined as the interior of a rectangular bounding box (or any geometrically defined bounding box) in an image in the training set. The locations of the bounding boxes can be parametrized by the Cartesian coordinates of their vertices. Once the sub-images are detected, the iterative process begins.

In some implementations, each extracted sub-image may be annotated with given key points. The given key points may be manually annotated, or may be annotated by an automated method, and may comprise an ordered list of coordinates in the image, wherein each coordinate represents the location of a key point. For example, in the context of human object types, key points may be points that depict body and skeletal points, e.g., elbow, head, torso, legs, etc. Some images in the training set of images may be annotated with a proper subset of the key points. For example, in the context of human object types, key points from the legs cannot be annotated on a sub-image depicting a human from the waist upwards. In these implementations, an extracted sub-image may be selected as a reference sub-image, and each other extracted sub-image may be transformed to align their respective key points with the key points of the reference sub-image. The transformation may involve both linear transformations, such as shifting and rotation, and non-linear transformations, such as a transformation parametrized by the displacements of a grid of control points. The transformation may be computed by maximizing a similarity measure between the key points of the sub-image to be transformed and the key points of the reference sub-image.

Figure 3:
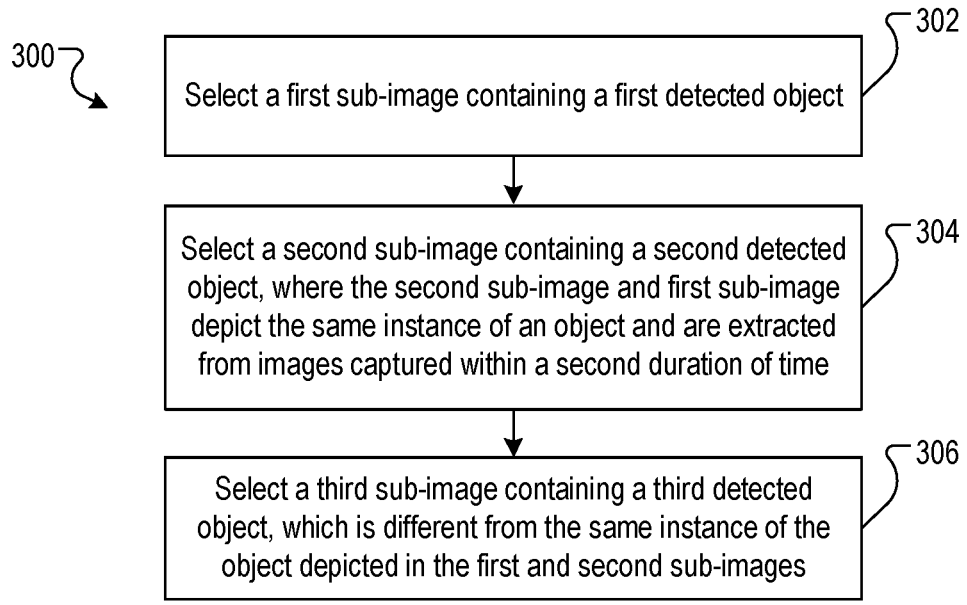
FIG. 3 is a flow diagram of an example process for generating a feasible image triplet.

The process 200 selects image triplets (206). The triplet selection layer 108 selects image triplets from the sub-images containing the detected objects 106. One example way of selecting image triplets is described with reference to process 300 of FIG. 3, to which we now turn.

The process 300 selects a feasible image triplet by selecting a first sub-image 110 containing a first detected object (302), and a second sub-image 112 containing a second detected object, where the second sub-image and first sub-image depict a same instance of an object of the particular type, and are extracted from images captured within a second duration of time $T_2$ (304). For example, the same instance may be two images of a particular person take at the same or different times during the second duration. In some implementations, the first and second sub-images are selected based on the images from which they are extracted being captured during a particular event, for example a birthday party. The process 300 then selects a third sub-image 114 containing a third detected object of the particular type, which is different from the same instance of the object depicted in the first and second sub-images (306).

In a given iteration, a proper subset of all feasible image triplets may be selected. In any given iteration, "hard" image triplets, where the feature representations of the first and second sub-images in the image triplet are as dissimilar as possible, and where the feature representations of the first and third sub-images in the image triplet are as similar as possible, may be preferentially selected in order to speed up training of the image embedding function.

Note that step 206 is depicted as a first iteration step, but in some implementations step 206 may be performed once, and step 208 may be the first iterative step.

Returning to FIG. 2A, the process 200 provides each of the first, second and third sub-images of each selected image triplet as input to the image embedding function (208). For example, as shown in FIG. 1A, the triplet selection layer 108 provides the first sub-image 110, the second sub-image 112 and the third sub-image 114 of an image triplet to the image embedding function $f(.)$ to generate instances $f(.)$ 116, $f(.)$ 118 and $f(.)$ 120. Each instance uses the same embedding function $f(.)$ but receives only one of the images in the image triplet as input.

The process 200 generates, by the image embedding function, representations of the visual features of each of the images in each image triplet (210). For example, as shown in FIG. 1A, the representations $f(A)$, $f(P)$, and $f(N)$ are generated. In some implementations, the embedding function generates a mapping of the image in Euclidean space as an output representation of features. However, other functions generating other representations can be used.

Figure 4:
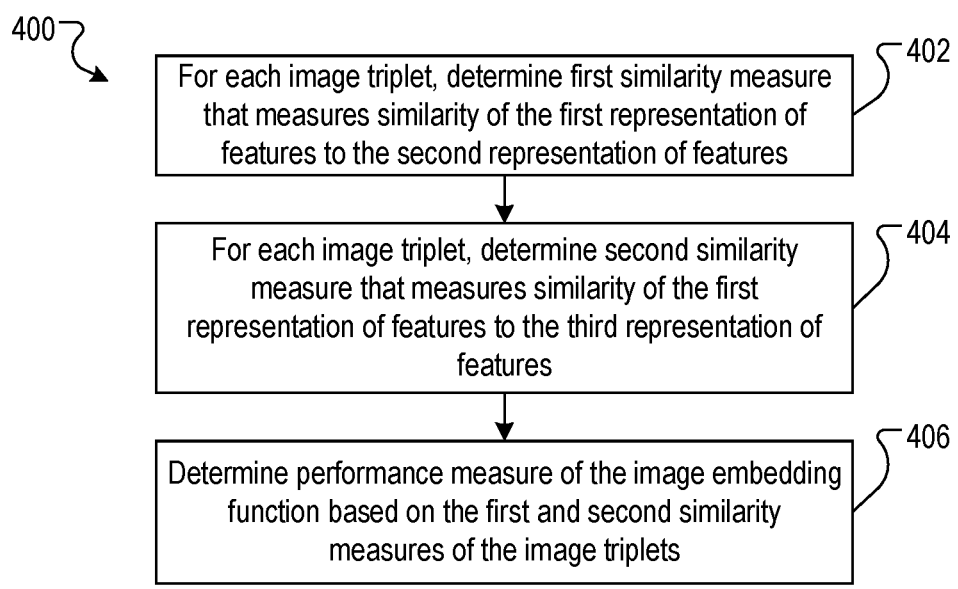
FIG. 4 is a flow diagram of an example process for determining the performance measure of the image embedding function.

The process 200 determines a performance measure of the image embedding function based on similarity measures of the respective feature representations of the image triplets (212). One example way of determining the performance measure is described with reference to process 400 of FIG. 4, to which we now turn.

For each triplet, the process 400 determines a first similarity measure that measures a similarity of the first representation of features of the first image in the image triplet to the second representation of features of the second image in the image triplet (402). Likewise, for each image triplet, the process 400 determine a second similarity measure that measures a similarity of the first representation of features of the first image in the image triplet to the third representation of features of the third image in the image triplet (404).

The process 400 then determines the performance measure of the image embedding function based on the first and second similarity measures of the image triplets (406). In the case of the embedding function mapping an image into Euclidean space, the model performance measure layer 130 may use the Euclidean distance as the similarity measure, e.g., $$D(f(A),f(P))=\|f(A)-f(P)\|_2^2$$

Thus, the smaller the distance D, the more similarity there is between the feature representation $f(A)$ and the feature representation $f(P)$ (or $f(A)$ and $f(N)$). Conversely, the larger the distance D, the less similarity there is between the feature representation $f(A)$ and the feature representation $f(P)$ (or $f(A)$ and $f(N)$).

Again, other metrics can be used to measure the similarity between feature representations. The similarity measurement used may depend on the representation that the image embedding function $f(.)$ generates.

In the case where the similarity measure is the Euclidean distance, the model performance measure layer 122 may determine the first and second similarity measures for the image triplet based on the first Euclidean distance, between the feature representation of the anchor image and the feature representation of the positive image, and the second Euclidean distance, between the feature representation of the anchor image and the feature representation of the negative image. When this type of image embedding function is used, the system 100 attempts to learn an image embedding function $f(.)$ that generates feature representations for image triplets wherein the first similarity measure is smaller than the second similarity measure, which can be expressed as:

$$\|f(A)-f(P)\|_2^2 + \alpha < \|f(A)-f(N)\|_2^2$$
$$\forall (A, P, N) \in \Gamma$$

Where $\alpha$ is a specified margin that is enforced between positive and negative pairs, and $\Gamma$ is the set of selected image triplets.

The performance measure may involve determining a hinge loss based on a difference of the first Euclidean distance and the second Euclidean distance for an image triplet, e.g., $$L = [\|f(A) - f(P)\|_2^2 - \|f(A) - f(N)\|_2^2 + \alpha]_+$$

The performance measure may involve summing the hinge loss terms for each selected image triplet, e.g.:

$$L = \sum_{i=1}^{N} [\|f(A_i) - f(P_i)\|_2^2 - \|f(A_i) - f(N_i)\|_2^2 + \alpha]_+$$

In some implementations, each extracted sub-image may be annotated with given key points, and the image embedding function may be iteratively trained on image triplets and the key point annotations. In some implementations, the output of the image embedding function comprises the representation of features of the input image and predicted key point annotations for the input image. In these implementations, the performance measure may include a similarity measure between the key point annotations predicted by the image embedding function and the given key point annotations. In some other implementations, the input of the image embedding function comprises an input image and the annotated key points of the input image.

Other types of performance measures, depending on the output of the image embedding function ƒ(.) can also be used.

Returning to FIG. 2A, the process 200 adjusts the parameter weights of the image embedding function based on the performance measure (214). For example, the parameter weights of the image embedding function are adjusted based on the performance measure of the image embedding function. The parameter weights may be adjusted to improve the performance of the image embedding function according to the performance measure. Adjusting may involve computing the gradient of the loss function with respect to the network parameters, and adjusting the network parameters based on the gradient. The aggressiveness of the parameter weight update based on the gradient may depend on a scalar "learning rate" variable. The learning rate may change between iterations.

The process 200 determines if a cessation event has occurred (216). A cessation event is an event that causes the training process to stop performing further training iterations. For example, a maximum number of training iterations being reached, the performance measure achieving a specified threshold, and the change in the performance measure between iterations achieving a specified threshold, may be cessation events. A cessation event may be based on a second performance measure of the image embedding function evaluated based on image triplets which are not selected for inclusion in any iteration of the training process. If a cessation event is determined to have occurred, then the training terminates.

If a cessation event is determined not to have occurred, then the process 200 may return to step 206 (or step 208, depending on the implementation), and repeat. Otherwise, the training ends (218).

Figure 2B:
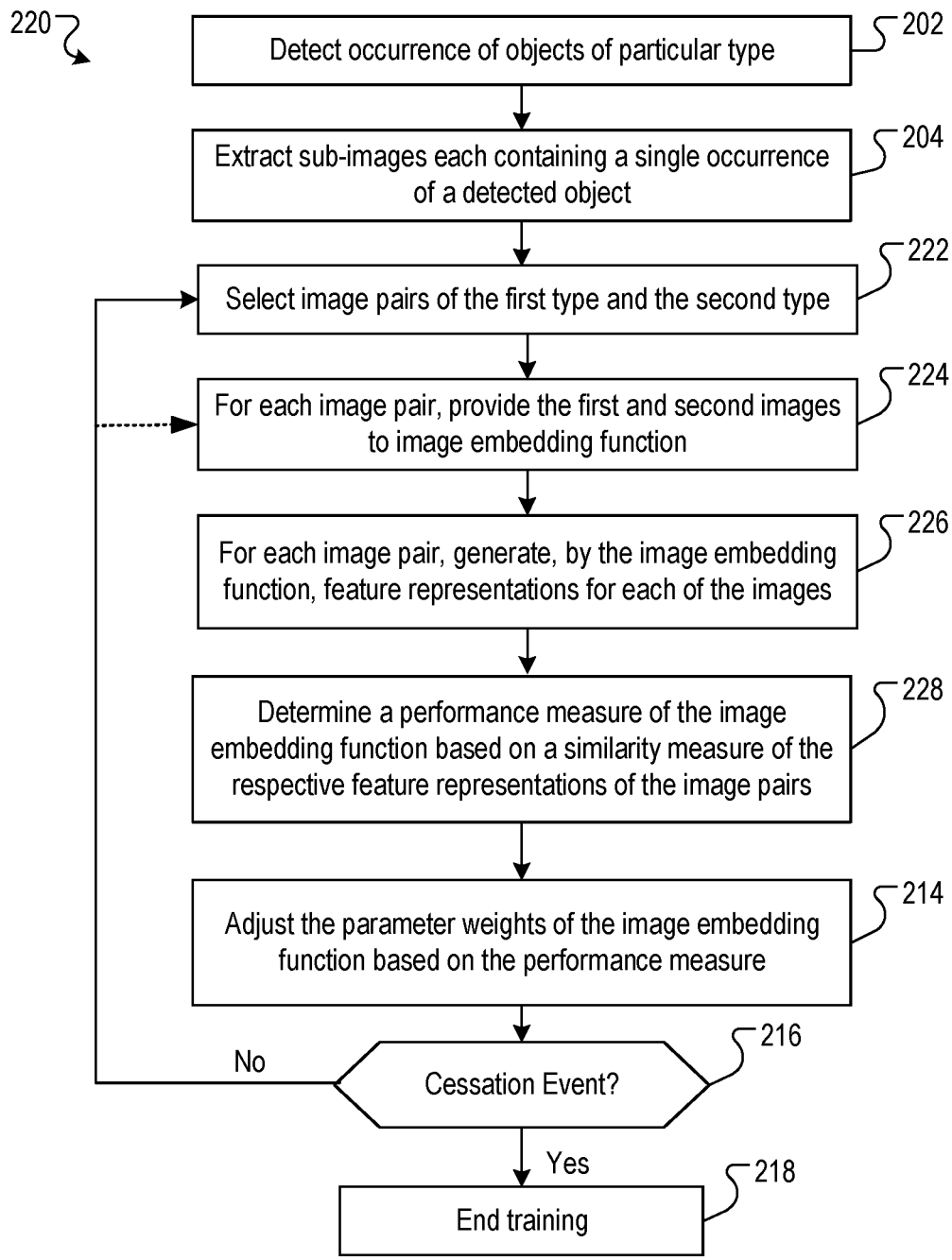
FIG. 2B is a flow diagram of an example process for learning the image embedding function based on image pair training data

As described above, in other implementations, such as the example of FIG. 2B, image pairs are used. Operation of this example implementation is described with reference to FIG. 2B, which is a flow diagram of an example process 220 for learning the image embedding function based on image pair training data. The process 220 can be implemented in a data processing apparatus system of one or more networked computers, and the data processing apparatus performs the steps described below unless other stated.

The process 220 is analogous to the process 200, except the image embedding function is learned based on image pair training data instead of image triplet training data. Accordingly, only steps 222, 224, 226 and 228 are described below; the other steps are as described in FIG. 2A.

The process 200 selects image pairs of the first type and the second type (step 222), for each image pair, provides the first and second images to the image embedding function (step 224), for each image pair, generates feature representations for each of the images by the image embedding function (step 226), determines a performance measure of the image embedding function based on a similarity measure of the respective feature representations of the image pairs (step 228), and otherwise proceeds analogously to the process 200.

Figure 5:
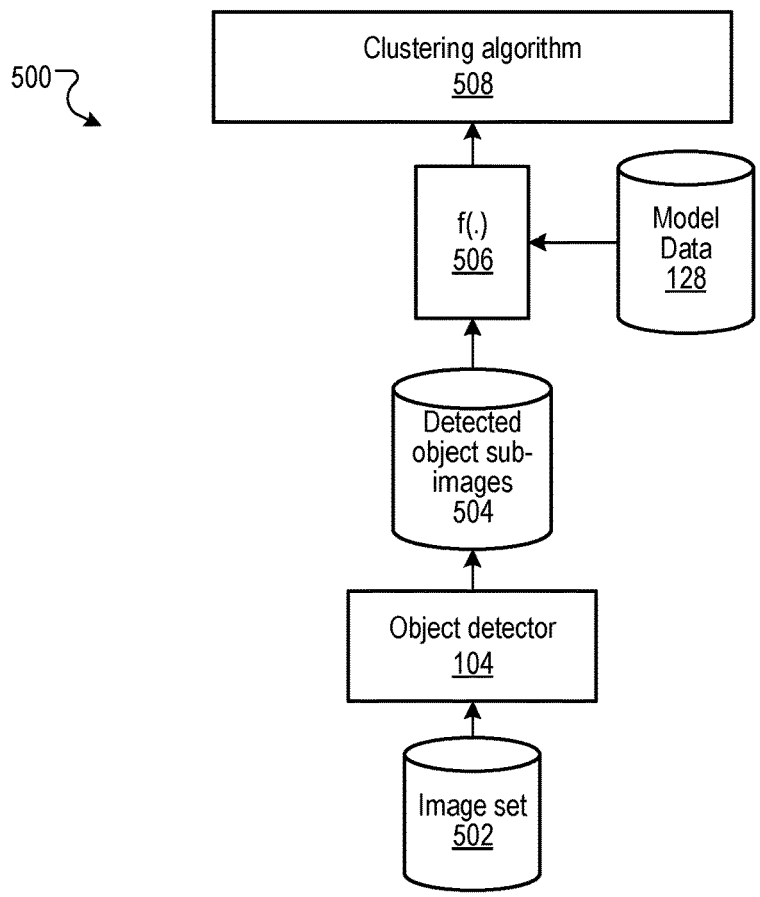
FIG. 5 is a block diagram of a network architecture for assigning images groups based on detected object occurrences in the images.

The trained model may then be persisted and implemented in an image processing system. One such application of the trained image embedding function is described with reference to FIG. 5, which is a block diagram of a system 500 for grouping photos from an image set 502 using the trained image embedding function. The system 500 can be implemented in a data processing apparatus system of one or more networked computers.

The system 500 groups images from an image set based on the occurrence of objects of a particular type in the images. The model data 128 corresponds to an image embedding function 506 that is trained, by the process 200, to generate representations of objects of the particular type. The object detector 104 detects objects of the particular type from images in the image set, and sub-images depicting occurrences of the detected objects 504 are extracted. The image embedding function 506, trained as described above, generates representations of features of the sub-images depicting the detected objects of the particular type, and a clustering algorithm 508 assigns these representations of features to groups.

Figure 6:
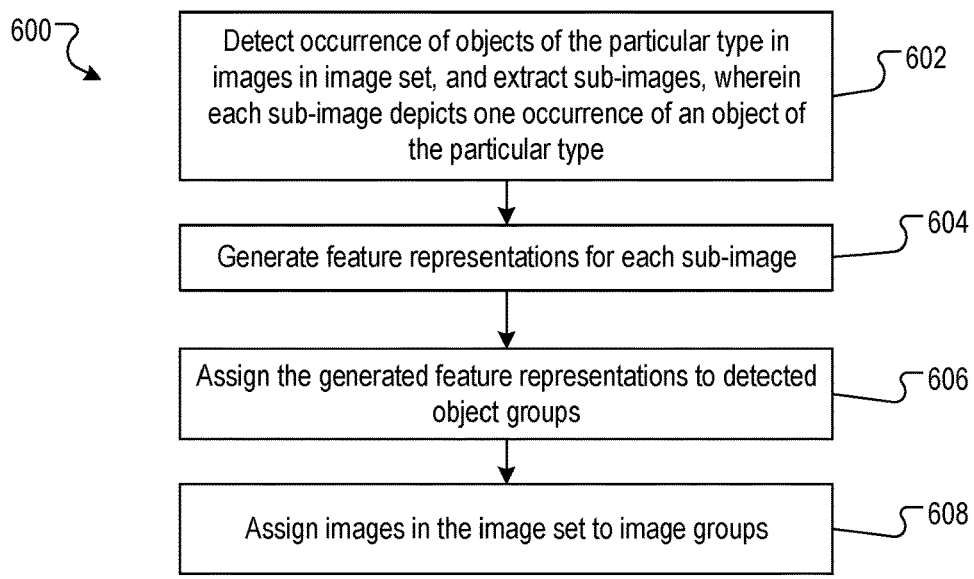
FIG. 6 is a flow diagram of an example process for assigning images groups based on detected object occurrences in the images.

Operation of the system 500 is described with reference to FIG. 6, which is a flow diagram of an example process 600 for grouping images from an image set based on the occurrence of objects of a particular type in the images. The process 600 can be implemented in a data processing apparatus system of one or more networked computers, and the data processing apparatus performs the steps described below unless other stated.

The process 600 detects occurrences of objects of the particular type in images in the image set, and extracts sub-images from the images, where each sub-image depicts one occurrence of an object of the particular type (602). This step may be similar to steps 202 and 204 described above.

The process 600 generates feature representations for each sub-image by inputting each sub-image to the trained image embedding function 5-6, which generates the feature representation (604). The trained image embedding function 506 has been trained as described above.

The process 600 assigns the generated feature representations to detected object groups by clustering the generated representations of features of the extracted sub-images (606). For example, in implementations where the image embedding function maps into Euclidean space, the clustering algorithm may be a k-means algorithm or an expectation-maximization (EM) algorithm.

The process 600 assigns images in the image set to image groups (608). The assignment may be based on the detected object groups, wherein a first image from the image set and a second image from the image set are assigned to a same image group if a first sub-image extracted from the first image and a second sub-image extracted from the second image are assigned to the same detected object group. Note that one image in the image set may be assigned to multiple image groups. For example if a first image showed object instance A, a second image showed object instance B, and a third image showed both object instances A and B, wherein object instances A is different from object instance B, then the first image and the second image would be assigned to different image groups, and the third image would be assigned to both different image groups.

In one implementation, the particular type of object is full human bodies, and the system 500 is applied to group personal photos, wherein photos depicting a same person are assigned to a same group. Methods for grouping personal photos based on similarities of detected faces have difficulty successfully grouping photos in cases where faces are not recognizable. Faces may not be recognizable for reasons including being small, occluded, or in back view. However, grouping personal photos based on similarities of detected full bodies, wherein two images are assigned to a same image group if representations of features of sub-images depicting full bodies detected in each image are assigned to a same detected object group, is more robust to these challenges.

In some implementations, the system of FIG. 1A or FIG. 1B can be used to train an artificial neural network structure which implements the image embedding function $f(.)$. The artificial neural network computes the embedding of an image $I:f(I) \in R^d$, where d is the dimension of feature embedding.

As described above, the performance measure layer 122 evaluates the embedding function's performance. In the case of a neural network being used to generate the embedding function, the performance measure layer 122 back-propagates the gradients to lower layers of the network so that the lower layers can adjust their parameters to minimize the loss.

The neural network may comprise multiple stacked layers, each stacked layer consisting of multiple neurons, each neuron configured to receive multiple inputs and equipped with an activation function. The layers may include convolutional layers, pooling layers, local normalization layers, and fully-connected layers. The activation function may be a sigmoid, tan h, rectified linearity, leaky rectified linearity, or maxout.

Convolutional layers receive an input and convolve it with a set of learned kernels to produce feature maps. The kernels may adaptively learn to detect local image features relevant to the embedding, such as edges.

Max pooling layers perform max pooling over a local neighborhood around a pixel. The max pooling involves selecting a maximum of a block that is pooled. Average pooling layers perform average pooling over a local neighborhood around a pixel. The average pooling involves computing the average of a block that is pooled. Pooling layers can make the feature maps robust to small translations.

Normalization layers normalize the outputs of the convolutional neural networks to a normalized scale. In some implementations, the normalization layers normalize the feature maps around a local neighborhood to have unit norm and zero mean. This leads to feature maps that are robust to the differences in illumination and contrast.

The neural network may implement one or more parameter weight regularization strategies. The performance measure may be a loss function that includes a regularization term which computes the norm of the parameter weights of the neural network. The neural network may implement dropout, which involves randomly dropping neurons to prevent neuron co-adaptation.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network.

The computing system can include users and servers. A user and server are generally remote from each other and typically interact through a communication network. The relationship of user and server arises by virtue of computer programs running on the respective computers and having a user-server relationship to each other.

While this specification contains many specific implementation details, these should not be construed as limitations on the scope of what may be claimed. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data-processing apparatus, the method comprising:
    detecting occurrences of objects of a particular type in each image in a training set of images, wherein the images in the training set of images are images that have been captured within a first duration of time;
    extracting sub-images from the images in the training set of images, wherein each sub-image depicts one occurrence of a detected object;
    iteratively training an image embedding function, wherein the image embedding function comprises a set of parameter weights that operate on an input image to produce as output a representation of features of the input image, each iteration of the training comprising:
        selecting a plurality of image pairs of a first type and a plurality of image pairs of a second type from the extracted sub-images, each image pair being a combination of a first sub-image and a second sub-image, wherein:
            each image pair of the first type comprises a first sub-image and a second sub-image that depict a same instance of an object of the particular type;
            each image pair of the second type comprises a first sub-image and a second sub-image that depict different instances of objects of the particular type; and
            for each image pair of the first type:
                the first sub-image of the image pair of the first type was extracted from a corresponding first image and the second sub-image of the image pair of the first type was extracted from a corresponding second image, wherein a duration of time that elapsed between when the first image and the second image corresponding to the image pair of the first type were captured is shorter than a second duration of time, wherein the second duration of time is shorter than the first duration of time; and
                the duration of time that elapsed between when the first image and the second image corresponding to the image pair of the first type were captured is different than the respective duration of time that elapsed between when the first image and the second image corresponding to each other selected image pair of the first type were captured;
        providing each selected image pair as input to the image embedding function and generating corresponding outputs;
        determining a performance measure of the image embedding function;
        adjusting the parameter weights of the image embedding function based on the performance measure; and
        performing another iteration of the training until a cessation event occurs.

2. The computer-implemented method of claim 1, wherein selecting image pairs of the first type and of the second type comprises selecting image triplets, each image triplet being a combination of a first sub-image, a second sub-image, and a third sub-image, wherein:

the image pair comprising the first sub-image and second sub-image is an image pair of the first type; and the image pair comprising the first sub-image and the third sub-image is an image pair of the second type.

3. The computer-implemented method of claim 2, wherein providing an image triplet as input to the image embedding function and generating corresponding outputs comprises generating, by the image embedding function, a first representation of the features of the first image in the image triplet, a second representation of the features of the second image in the image triplet, and a third representation of the features of the third image in the image triplet.

4. The computer-implemented method of claim 3, wherein determining the performance measure of the image embedding includes, for each selected image triplet:

determining, based on the first representation of features and the second representation of features, a first similarity measure that measures a similarity of the first representation of features to the second representation of features; and determining, based on the first representation of features and the third representation of features, a second similarity measure that measures a similarity of the first representation of features to the third representation of features.

5. The computer-implemented method of claim 4, wherein:

the image embedding function generates mappings of input images in Euclidean space as output feature representations; and for each selected image triplet:

determining the first similarity measure comprises determining a first Euclidean distance between the first representation of the features and the second representation of features; and determining the second similarity measure comprises determining a second Euclidean distance between the first representation of the features and the third representation of features.

6. The computer implemented method of claim 5, wherein determining a performance measure of the image embedding function is based on the first Euclidean distance and the second Euclidean distance for each selected image triplet.

7. The computer-implemented method of claim 6, wherein determining the performance measure based on the first Euclidean distance and the second Euclidean distance for each selected image triplet comprises determining a hinge loss based on a difference of the first Euclidean distance and the second Euclidean distance for each selected image triplet.

8. The computer-implemented method of claim 7, wherein determining the performance measure comprises summing the hinge losses for the selected image triplets.

9. The computer-implemented method of claim 1, wherein the image embedding function comprises a convolutional neural network.

10. The computer-implemented method of claim 1, wherein the objects are full human bodies.

11. The computer-implemented method of claim 1, wherein the feature representations generated by the trained neural network are assigned to groups using a clustering algorithm.

12. The computer-implemented method of claim 1, wherein:

each extracted sub-image is annotated with key points;

the output of the image embedding function comprises the feature representation of the input image and predicted key point annotations of the input image; and determining the performance measure of the image embedding function includes determining a similarity between the predicted key point annotations and the key point annotations.

13. The computer-implemented method of claim 1, wherein extracting sub-images from the images in the training set of images further comprises:

annotating each sub-image with key points;

selecting a particular sub-image as a reference image; and transforming each sub-image to align its key points with the key points of the reference sub-image.

14. The computer-implemented method of claim 1, wherein:

each extracted sub-image is annotated with key points;

the input of the image embedding function comprises an input image and annotated key points of the input image; and providing each selected image pair as input to the image embedding function further comprises providing the annotated key points of each sub-image in each selected image pair as inputs to the image embedding function.

15. The computer-implemented method of claim 1, wherein for an image pair of the first type, the first sub-image and the second sub-image are selected based the images from which they are extracted being captured during a particular event.

16. The computer-implemented method of claim 1, wherein for an image pair of the first type, the first sub-image and the second sub-image are selected based on the images from which they are extracted being captured within the second duration of time.

17. A system comprising:

one or more computing devices; and one or more computer-readable media coupled to the one or more computing devices and having instructions stored thereon which, when executed by the one or more computing devices, cause the one or more computing devices to perform operations comprising:

detecting occurrences of objects of a particular type in each image in a training set of images, wherein the images in the training set of images are images that have been captured within a first duration of time;

extracting sub-images from the images in the training set of images, wherein each sub-image depicts one occurrence of a detected object;

iteratively training an image embedding function, wherein the image embedding function comprises a set of parameter weights that operate on an input image to produce as output a representation of features of the input image, each iteration of the training comprising:

selecting a plurality of image pairs of a first type and a plurality of image pairs of a second type from the extracted sub-images, each image pair being a combination of a first sub-image and a second sub-image, wherein:

each image pair of the first type comprises a first sub-image and a second sub-image that depict a same instance of an object of the particular type;

each image pair of the second type comprises a first sub-image and a second sub-image that depict different instances of objects of the particular type; and for each image pair of the first type:
   the first sub-image of the image pair of the first type was extracted from a corresponding first image and the second sub-image of the image pair of the first type was extracted from a corresponding second image, wherein a duration of time that elapsed between when the first image and the second image corresponding to the image pair of the first type were captured is shorter than a second duration of time, wherein the second duration of time is shorter than the first duration of time; and
   the duration of time that elapsed between when the first image and the second image corresponding to the image pair of the first type were captured is different than the respective duration of time that elapsed between when the first image and the second image corresponding to each other selected image pair of the first type were captured;
providing each selected image pair as input to the image embedding function and generating corresponding outputs;
determining a performance measure of the image embedding function;
adjusting the parameter weights of the image embedding function based on the performance measure; and
performing another iteration of the training until a cessation event occurs.

18. A computer storage medium encoded with a computer program, the program comprising instructions that when executed by data processing apparatus cause the data processing apparatus to perform operations comprising:
detecting occurrences of objects of a particular type in each image in a training set of images, wherein the images in the training set of images are images that have been captured within a first duration of time;
extracting sub-images from the images in the training set of images, wherein each sub-image depicts one occurrence of a detected object;
iteratively training an image embedding function, wherein the image embedding function comprises a set of parameter weights that operate on an input image to produce as output a representation of features of the input image, each iteration of the training comprising:
selecting a plurality of image pairs of a first type and a plurality of image pairs of a second type from the extracted sub-images, each image pair being a combination of a first sub-image and a second sub-image, wherein:
   each image pair of the first type comprises a first sub-image and a second sub-image that depict a same instance of an object of the particular type;
   each image pair of the second type comprises a first sub-image and a second sub-image that depict different instances of objects of the particular type; and
   for each image pair of the first type:
      the first sub-image of the image pair of the first type was extracted from a corresponding first image and the second sub-image of the image pair of the first type was extracted from a corresponding second image, wherein a duration of time that elapsed between when the first image and the second image corresponding to the image pair of the first type were captured is shorter than a second duration of time, wherein the second duration of time is shorter than the first duration of time; and
      the duration of time that elapsed between when the first image and the second image corresponding to the image pair of the first type were captured is different than the respective duration of time that elapsed between when the first image and the second image corresponding to each other selected image pair of the first type were captured;
providing each selected image pair as input to the image embedding function and generating corresponding outputs;
determining a performance measure of the image embedding function;
adjusting the parameter weights of the image embedding function based on the performance measure; and
performing another iteration of the training until a cessation event occurs.

* * * * *